April 22, 1958     JEAN-FELIX PAULSEN     2,831,673
RESILIENT INTERCONNECTING SYSTEMS OF
THE VARIABLE FLEXIBILITY TYPE
Filed July 16, 1954                              3 Sheets-Sheet 1
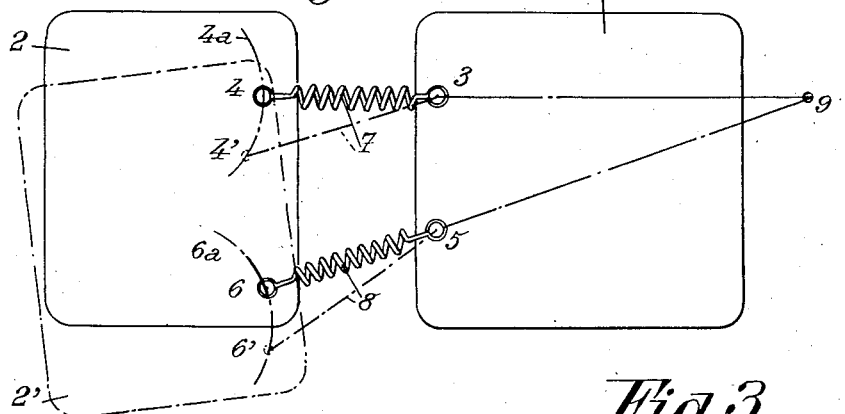
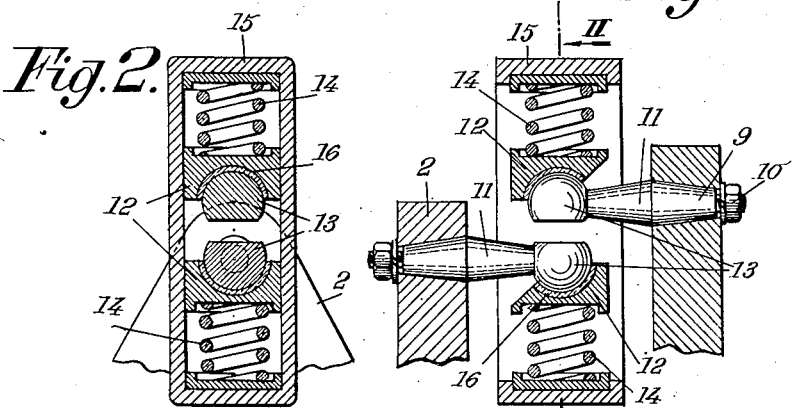
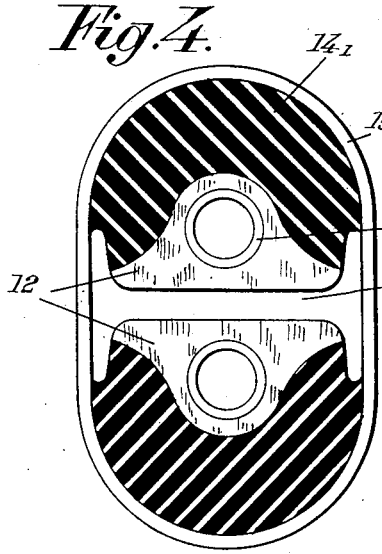
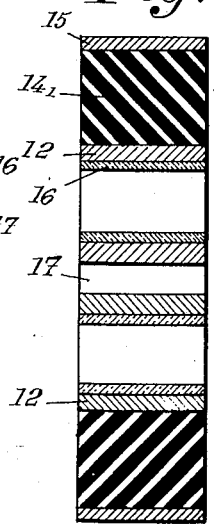
INVENTOR
JEAN FELIX PAULSEN,
BY
Robert B. Larson
ATTORNEY

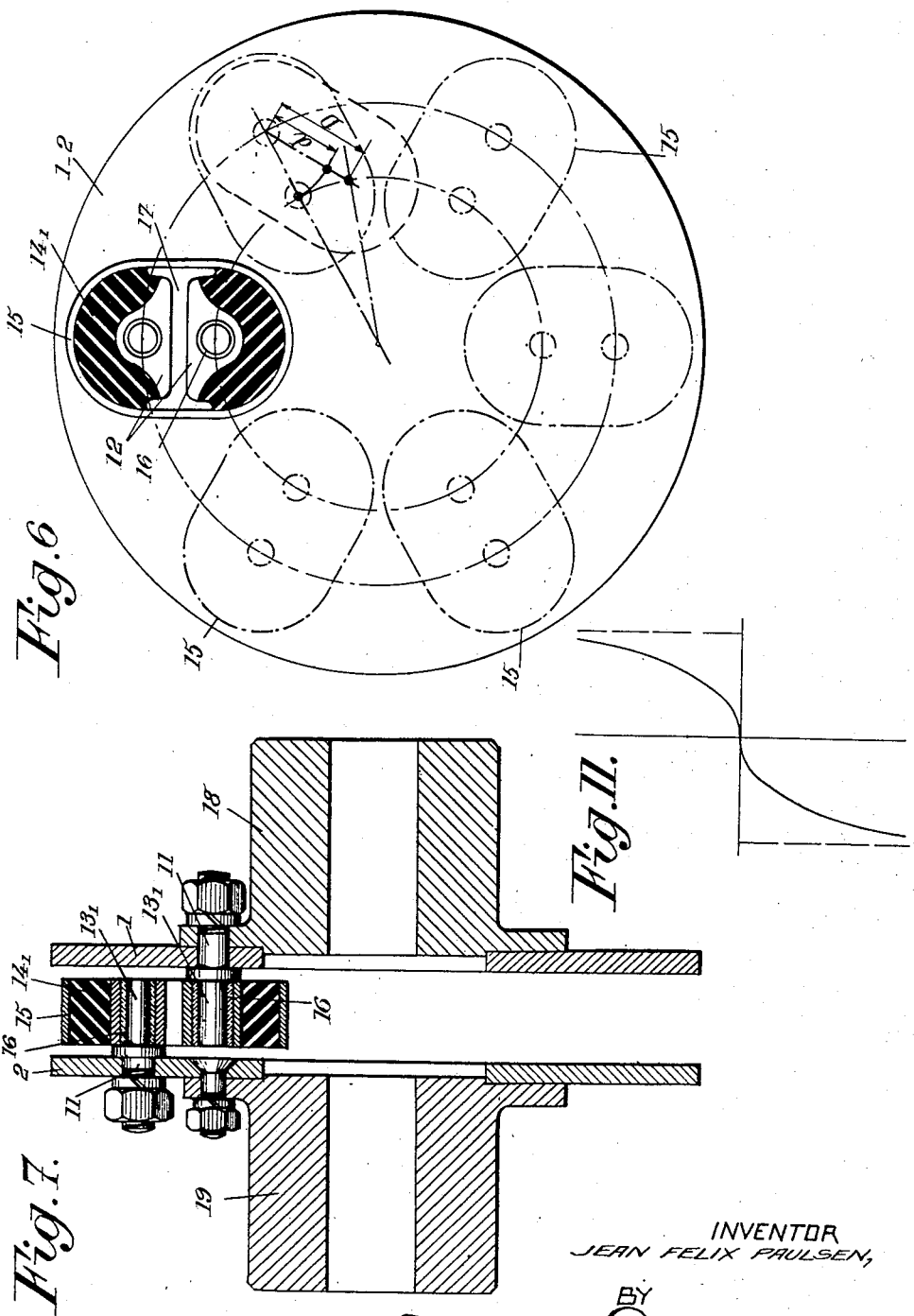

April 22, 1958     JEAN-FELIX PAULSEN     2,831,673
RESILIENT INTERCONNECTING SYSTEMS OF
THE VARIABLE FLEXIBILITY TYPE
Filed July 16, 1954     3 Sheets-Sheet 3
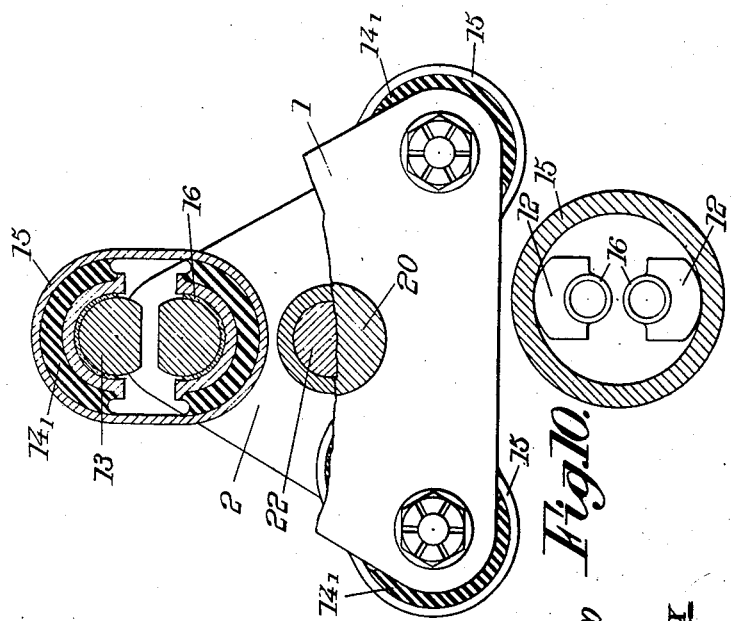
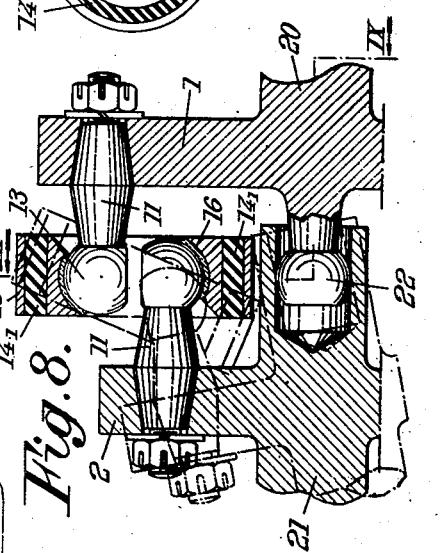
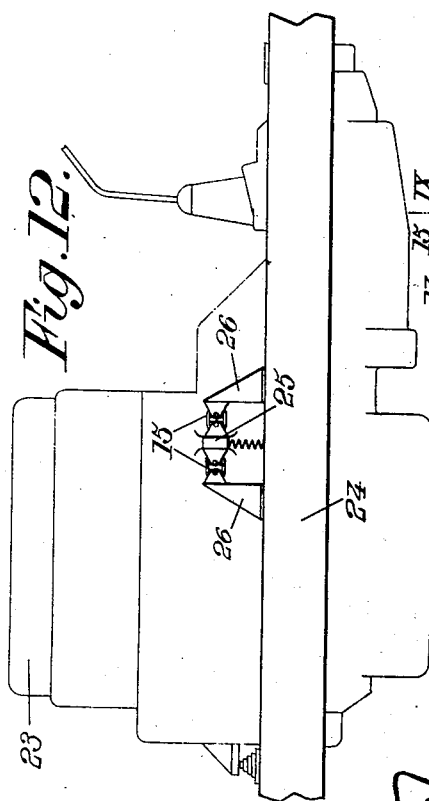
INVENTOR
JEAN FELIX PAULSEN,
BY
Robert B. Pearson ATTORNEY United States Patent Office 2,831,673
Patented Apr. 22, 1958

2,831,673

RESILIENT INTERCONNECTING SYSTEMS OF THE VARIABLE FLEXIBILITY TYPE

Jean-Félix Paulsen, Paris, France, assignor to Societe Luxembourgeoise de Brevets et de Participations, Luxemburg, Luxemburg Application July 16, 1954, Serial No. 443,870

Claims priority, application France July 22, 1953

3 Claims. (Cl. 267—1)

The present invention relates to resilient interconnecting systems of the variable flexibility type, intended in particular to be interposed between two rigid or practically rigid units which are liable to have, with respect to each other and about a mean reference position, relative movements of limited amplitude, both of revolution and of translation.

The chief object of my invention is to provide a system of this kind which is better adapted to meet the requirements of practice.

One feature of my invention is concerned with such systems comprising at least two resilient devices, each interposed between a portion of one of said parts and a portion of the other part, said portions being different for said two devices, and this feature consists essentially in the fact that each of said devices is constituted by a resiliently expansible link-like element freely pivoted to each of said parts respectively.

According to another feature of my invention, a device for resiliently interconnecting two rigid parts, and in particular a device for use as one of the link-like elements of the above described system including two such devices, includes an external frame or ring in which are located two bearings adapted each to receive the efforts applied from one of said parts, with the interposition between said bearings and said frame of resilient means, preferably arranged to bear compression stresses and advantageously constituted by masses of rubber or another plastic material.

Preferred embodiments of the present invention will be hereinafter described with reference to the accompanying drawings, given merely by way of example and in which:

Fig. 1 diagrammatically illustrates two rigid parts interconnected by an elastic system according to my invention.

Figs. 2 and 3 show, respectively in section on the line II—II of Fig. 3 and in axial section, an elastic system according to my invention to interconnect two rigid parts.

Figs. 4 and 5 similarly show another embodiment of my invention.

Figs. 6 and 7 show, respectively in elevational view and in axial view, an elastic coupling between two shafts, made according to my invention.

Figs. 8 and 9 show, respectively in axial section and in section on the line IX—IX of Fig. 8, with parts cut away, a universal joint made according to my invention.

Fig. 10 is a sectional view of an interconnecting system made according to a modification.

Fig. 11 is a curve showing the flexibility of systems according to my invention.

Fig. 12 is an elevational view of the application of a system according to my invention to the suspension of internal combustion engines on a vehicle.

In order to illustrate the principle of my invention, Fig. 1 shows two rigid parts 1 and 2 which may be of any suitable shape, two pairs of respective points of which, such as 3 and 4 and 5 and 6, are to be interconnected. In the position shown in solid lines, said points are shown in their mean relative position. Curves 4a, 6a show the relative displacements of points 4 and 6 when body 2 is moving with respect to body 1, and 4' and 6' are two particular positions of points 4 and 6 in the course of the relative movement of body 2.

The respective points 3—4, 5—6 are chosen in such manner that when point 4 is moving along curve 4a, distance 4'—3 is always longer than distance 4—3, and likewise 6'—5 is longer than 6—5, whereby, for position 4—6, there is an instantaneous centre of rotation of body 2 with respect to body 1 located at 9.

According to my invention, I provide between respective points 3—4 and 5—6 expansible link-like structures 7, 8 freely pivotable about said points (or at least pivotable with some degree of freedom), these link-like structures being preferably such that they have an elasticity which quickly decreases when they are expanded. It may even be considered that, owing to the provision of suitable abutment means, these structures are no longer expansible when they have been expanded to a given limit.

In particular, these links may be in the form of chain links inside which are movable, against the action of elastic means, bearings to which are applied the forces transmitted from bodies 1 and 2, these bearings being adapted for instance to receive: either trunnions (Figs. 4 to 7) when the two bodies are to move parallel to a given plane (two degrees of freedom); or swivels (Figs. 2, 3 and 8, 9) if the two bodies can have any relative displacements (three degrees of freedom).

In the construction of Figs. 2 and 3, in order to interconnect two parts 1, 2 which may be displaced in any possible way with respect to each other, these parts are fitted with rods 9—11 fixed by nuts 10 to said parts. The ends of rod portions 11 are engaged in bearings 12 in ball and socket fashion, the balls being constituted, in the example shown, by the ends 13 of rod portions 11. Bearings 12 are carried by springs 14 interposed between said bearings and a metal shackle 15 which constitutes the link. It should be well understood that this shackle might itself be resiliently deformable.

Antifriction linings may be interposed at 16 between bearings 12 and balls 13. Springs 14 (or equivalent resilient means) may be fitted with means for adjusting their tension or compression. Said resilient means may be prestressed in their mean position. In this case, the prestressing efforts of the springs or equivalent means should be balanced, either due to the symmetry of assembly or by reactions at other points.

These springs may be replaced by rubber masses or other plastic masses $14_1$, as shown on Figs. 4, 5 and 6, 7, where trunnions $13_1$ (Fig. 7) which are located at the ends of rods 11 cooperate with bearings 12 (it being supposed that pieces 1, 2 have two degrees of freedom). The plastic matter $14_1$ is interposed between said bearings and the shackle 15 of the device. It should be well understood that the material of $14_1$ may either be subjected to compressive (and possibly expansive) stresses, or to shearing stresses, or again to both of these kinds of stresses, in particular as illustrated by Figs. 8 and 9. A bracing member may be provided at 17 upon which the bearings can be supported in the mean position, possibly with shock absorbing cushions.

According to my invention, I may eliminate the elastic means such as 14 or $14_1$ and make use only of the elastic deformation of ring-shaped shackle 15. Fig. 10 illustrates such an arrangement. It will be seen that bearings 12, in this construction, are tangent internally to shackle 15.

Elastic interconnecting systems as above described work as illustrated by Fig. 11 which shows in ordinates the stresses that are applied and in abscissas the relative displacements of parts 1, 2, or the variations of length of the links. It will be seen that for the mean position, the reaction exerted by said systems is substantially zero, whereas it quickly increases when the springs or elastic masses are compressed, to become practically rigid for a given deformation.

Such systems may be applied in many cases.

Figs. 6 and 7 show the application of my invention to the coupling of two shaft coupling members 18 and 19. Parts 1 and 2 are rigid with these shafts and they are connected between them, for instance through means as shown by Figs. 4 and 5. An increase of the driving torque produces a variation of relative direction of the links, which in the absence of other stresses are directed radially. This variation has for its effect to increase the distance between trunnions $13_1$, this distance increasing from $d$ to D (Fig. 6). There is thus produced an opposed torque which increases quickly with the increase of the driving torque.

Figs. 8 and 9 show how my invention can be applied to a universal joint to be provided between two shafts 20 and 21. Parts 1 and 2, which are rigid with said shafts, have for instance a triangular shape with, at every apex thereof, devices according to my invention. Said devices are of the construction illustrated by Figs. 2 and 3 with the difference that the springs 14 of Figs. 2 and 3 are replaced by rubber masses $14_1$ such as shown by Figs. 4 and 5. The presence of ball and socket joints 13 makes it possible to obtain variations of direction in all directions. A centering is preferably provided at 22.

Fig. 12 illustrates the application of my invention to a vehicle internal combustion engine. I provide for instance, between engine 23 and its frame 24, interconnecting devices including in particular two links 15 of the type according to my invention, interposed between fixation lug 25 and supports 26.

Interconnecting systems according to my invention have the following advantages: they are easier to manufacture; they can more readily be assembled together; and generally it is possible to provide between two pieces a connection which, while permitting predetermined relative movements, produces antagonistic stresses which are practically zero when the parts are close to their mean position, whereas these stresses increase quickly with the amplitude of the relative displacements.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A deformable system which comprises, in combination, two rigid parts rotatable with respect to each other about at least one axis, and a plurality of devices for interconnecting said two parts, said devices being distributed at equal intervals about said axis, each of said devices including a shackle, a bearing inside said shackle, a piece freely rotatable in said bearing about at least one axis parallel to said first mentioned axis, said piece being fixed to one of said parts, another bearing inside said shackle, another piece freely rotatable in said last mentioned bearing about at least one axis parallel to said first mentioned axis and located at a distance therefrom smaller than the distance between the first mentioned axis and the second mentioned axis, said last mentioned piece being fixed to the other of said parts, and a mass of a resilient material interposed between each of said bearings and the portion of said shackle located on the side of the bearing remote from the other bearing, whereby said masses resiliently oppose displacements of said bearings away from each other, the distance from said first mentioned axis of said second mentioned axis being the same for all of said devices in the unstressed positions thereof, and the distance from said first mentioned axis of said third mentioned axis being the same for all of said devices.

2. A system according to claim 1 in which said bearings are cylindrical and parallel to said axes.

3. A deformable system which comprises, in combination, two rigid parts having each an axis of symmetry, cooperating means carried by said two parts to keep the respective axes of symmetry in intersecting relation to each other, a plurality of devices for interconnecting said two parts, said devices being distributed at equal intervals about said axis, each of said devices including a shackle, a part-spherical bearing inside said shackle, a part-spherical piece fitting in said bearing so as to form a ball-and-socket joint therewith, said piece being fixed to one of said parts, another part-spherical bearing inside said shackle, a part-spherical piece fitting in said last mentioned bearing so as to form a ball-and-socket joint therewith, said last mentioned piece being fixed to the other of said parts, the center of said last mentioned ball-and-socket joint being at a distance from the point of intersection of said axes shorter than the center of the first mentioned ball-and-socket joint, and a mass of a resilient material interposed between each of said bearings and the portion of said shackle located on the side of the bearing remote from the other of said bearings, whereby said masses resiliently oppose displacements of said bearings away from each other. The distance from said point of intersection of the center of the first mentioned ball-and-socket joint being the same for all of said devices in the unstressed positions thereof and the distance from said point of intersection of the center of the second mentioned ball-and-socket joint being the same for all of said devices.

References Cited in the file of this patent

UNITED STATES PATENTS

| 930,636 | Wescott | Aug. 10, 1906 |
| 1,641,385 | Hufferd | Sept. 6, 1927 |
| 1,778,170 | Smith et al. | Oct. 14, 1930 |
| 1,871,861 | Rossman | Aug. 16, 1932 |
| 1,939,444 | Geyer | Dec. 12, 1933 |
| 2,292,675 | Thiry | Aug. 11, 1942 |

FOREIGN PATENTS

| 10,702 | Great Britain | of 1892 |
| 246,300 | Great Britain | Jan. 28, 1926 |
| 630,824 | Great Britain | Oct. 21, 1949 |
| 660,876 | Great Britain | Nov. 14, 1951 |